United States Patent [19]
Minegishi

[11] Patent Number: 5,279,174
[45] Date of Patent: Jan. 18, 1994

[54] WORM SPEED REDUCER, AND MANUFACTURING METHOD FOR WORM AND WORM WHEEL

[75] Inventor: Kiyoji Minegishi, Aichi, Japan

[73] Assignee: Sumitomo Heavy Industries, Ltd., Tokyo, Japan

[21] Appl. No.: 885,701

[22] Filed: May 19, 1992

[30] Foreign Application Priority Data

May 20, 1991 [JP] Japan .................. 3-142746

[51] Int. Cl.$^5$ .................. B23F 13/00; F16H 1/16; F16H 55/06
[52] U.S. Cl. ................... 74/458; 29/893.31; 74/425; 409/48
[58] Field of Search ............... 74/425, 458; 29/893.31; 409/48

[56] References Cited

U.S. PATENT DOCUMENTS

| | | | |
|---|---|---|---|
| 3,368,263 | 2/1968 | Harris, Jr. ...................... | 29/893.31 |
| 3,396,595 | 8/1968 | Niemann ........................ | 74/458 X |
| 3,812,737 | 5/1974 | Campbell et al. ............. | 74/458 X |

FOREIGN PATENT DOCUMENTS 63-256318  10/1988  Japan ......................... 29/893.31

*Primary Examiner*—Allan D. Herrmann
*Attorney, Agent, or Firm*—Nikaido, Marmelstein, Murray & Oram

[57] ABSTRACT

A worm speed reducer consisting of a worm made of a relatively hard material such as cast iron or steel and a worm wheel made of a relatively hard material such as cast iron. A material strength is set so that an amount of wear of the worm becomes larger than that of the worm wheel. A tooth surface of the worm wheel is formed with a network irregularity extending in both a direction of a cutting scratch due to cutting and a direction intersecting the direction of the cutting scratch, and also formed with a chemical conversion coating having a thickness smaller than a height of the irregularity. A tooth surface of the worm is formed with a network irregularity extending in both a direction of a cutting scratch due to cutting (or a grinding scratch due to grinding) and a direction intersecting the direction of the cutting scratch (or the grinding scratch) of the worm, and also formed with a chemical conversion coating having a thickness smaller than a height of the irregularity of the worm. Accordingly, seizure resistance can be maintained not only in an initial stage of operation but also after operating the worm speed reducer for a long period of time, irrespective of the use of low-cost cast iron.

5 Claims, 8 Drawing Sheets

CONTACT SURFACES OF WORM AND WORM WHEEL ACCORDING TO THE PRESENT INVENTION

FIG. 1 PRIOR ART

CONTACT SURFACES OF WORM AND WORM WHEEL AFTER CUTTING

| | TOOTH DEPTH DIRECTION | TOOTH TRACE DIRECTION |
|---|---|---|
| WORM | (a) A B | (b) |
| WORM WHEEL | (c) C D | (d) |

CONTACT SURFACES OF WORM AND WORM WHEEL TREATED WITH CHEMICAL CONVERSION COATING AFTER CUTTING WORK

FIG. 3 PRIOR ART

CONTACT SURFACES SHOWN IN FIG. 2 AFTER OPERATION

| | TOOTH DEPTH DIRECTION | TOOTH TRACE DIRECTION |
|---|---|---|
| WORM | (i) | (j) |
| WORM WHEEL | (k) | (l) |

CONTACT SURFACES OF WORM AND WORM WHEEL ACCORDING TO THE PRESENT INVENTION

WORM SPEED REDUCER, AND MANUFACTURING METHOD FOR WORM AND WORM WHEEL

BACKGROUND OF THE INVENTION

1. Field of the Invention

The present invention relates to a worm and a worm wheel to be used for a worm speed reducer, and also relates to a manufacturing method for such a worm and a worm wheel.

2. Description of the Prior Art

As shown in FIGS. 7 and 8, a known worm speed reducer is constituted of a worm 2 formed on a worm shaft 1 as an input shaft and a worm wheel 4 fixed to an output shaft 3. The worm 2 and the worm wheel 4 are in mesh with each other so as to perform rolling and sliding motion through tooth surfaces thereof and transmit power as well as the motion. In the worm speed reducer shown in FIGS. 7 and 8, rotation of the worm shaft 1 is reduced in speed to be transmitted to the output shaft 3.

In a worm speed reducer, even when a worm and a worm wheel are identical in dimension with other ones, they are very different in allowable transmitting horsepower and seizure resistance from the other ones according to a manner of combination of materials. In general, a problem occurring most frequently in a worm speed reducer to be operated continuously is seizure of tooth surfaces, so that seizure resistance is a greatly important factor.

As an example of a worm speed reducer improved in seizure resistance, it is known that surface-hardened alloy steel is employed for the material of a worm and it is ground with a high accuracy, while a relatively soft bronze material such as phosphor bronze or aluminum bronze is employed for the material of a worm wheel, in order to provide good fit between the worm and the worm wheel.

However, the precision grinding of the worm causes an increase in manufacturing cost, and the employment of the bronze material for the worm wheel causes an increase in material cost itself. Although a worm speed reducer can provide a large reduction ratio in one stage and employs a small number of parts, it becomes expensive to improve seizure resistance.

In contrast, as a low-cost worm speed reducer, it is known that an iron material is employed for both a worm wheel and a worm. For example, cast iron is employed for the material of the worm wheel, and cast iron or steel is employed for the worm. The worm is manufactured by cutting only without performing precision grinding.

However, in such a low-cost worm speed reducer, seizure resistance of the material itself is low, and it is difficult to finish a tooth surface of the worm with a high hardness and a high accuracy. For this reason, an allowable transmitting torque is low, and a lubricating condition in an initial stage of operation becomes severe in association with a machining error. Accordingly, sufficient break-in must be performed to obtain good fit between tooth surfaces of the worm and the worm wheel.

Further, it is also generally known to form a chemical conversion coating such as a phosphate coating on a contact surface (tooth surface) of a gear, thereby reducing a coefficient of friction of the contact surface owing to the chemical conversion coating. A coefficient of friction of the chemical conversion coating itself is not low, but the coefficient of friction of the contact surface is reduced by retaining a large amount of lubricating oil in a fine irregularity formed on the contact surface.

Accordingly, although it is considered that the above known chemical conversion coating is to be formed on a contact surface of a worm, since the chemical conversion coating itself is apt to wear, it will be peeled off in a short time. Thus, the effect of the chemical conversion coating will disappear during an initial low-load operation of break-in of a worm speed reducer, so that improvement in transmitting torque cannot be expected.

On the other hand, it is also known that a network groove having a width of about $20\mu$ and a depth of about $30\mu$ at a pitch of about $50\mu$ is formed on a tooth surface (contact surface) of a relatively soft gear (worm wheel) of a pair of gears meshing with each other, thereby retaining a lubricating oil in the network groove to improve a lubricating ability during break-in of the gears (see Japanese Utility Model Publication No. 61-8278).

However, such a worm wheel is manufactured by preliminarily finely grinding the contact surface of the gear and then forming the network groove on the contact surface. Accordingly, a manufacturing step is increased to cause an increase in cost. Furthermore, since a soft material, e.g., a bronze material is required for the worm wheel, the cost is further increased from the viewpoint of the material.

Moreover, since the pitch of the network groove is large, a contact load strongly acts on a crest portion of the irregular contact surface to possibly increase wear of the contact surface. Further, since the network groove is constructed so as to become effective only in break-in and it will disappear by the time the break-in is ended, the improvement in the lubricating ability is temporary.

Additionally, since the network groove formed on the contact surface of the worm wheel is intended to improve the lubricating ability only during break-in, the irregularity on the contact surface due to the network groove will be worn off during a period of time such as by the time the break-in is ended. For this reason, a chemical conversion coating is not formed on the irregularity.

In general, meshing contact surfaces of a worm and a worm wheel of a worm speed reducer are required to have a high precision, so that they are finished by cutting or grinding. In case of requiring a low cost, the tooth surface of the worm is finished by cutting with a milling cutter 6 as shown in FIG. 6. Referring to FIG. 6, a contact surface 5 of the worm 2 formed on the worm shaft 1 is cut in a tooth trace direction X by the milling cutter 6. As a result, a cutting scratch consisting of a crest portion A and a trough portion B as shown in FIG. 1(a) is formed on the contact surface of the worm 2 in a tooth depth direction Y (perpendicular to the tooth trace direction X). The crest portion A and the trough portion B are substantially smooth in the tooth trace direction X as shown in FIG. 1(b).

Similarly, a cutting scratch consisting of a crest portion C and a trough portion D as shown in FIG. 1(c) is formed on a contact surface 7 of the worm wheel 4 in a tooth depth direction V (see FIG. 8). The crest portion C and the trough portion D are substantially smooth in a tooth trace direction U (see FIG. 8) as shown in FIG. 1(d).

As shown in FIGS. 2(e) to 2(h), in the case that a chemical conversion coating F such as a phosphate coating, an oxalate coating or a chromate coating is formed on the contact surface of the worm and the worm wheel shown in FIGS. 1(a) to 1(d), the chemical conversion coating F at the crest portion A of the worm meshing with the worm wheel is peeled off in a short time, and the chemical conversion coating F at the crest portion C of the worm wheel meshing with the worm is also peeled off in a short time.

Accordingly, no lubricating oil film is formed between the tooth surfaces of the worm and the worm wheel because of contact of the crest portions A and C. That is, the tooth surfaces contact each other in the condition of boundary lubrication or direct contact, causing the occurrence of seizure of the tooth surfaces. Therefore, a transmitting torque of the prior art worm speed reducer is limited by the seizure of the tooth surfaces.

SUMMARY OF THE INVENTION

It is accordingly an object of the present invention to provide a light, compact, low-cost worm speed reducer capable of generating a large transmitting torque wherein cast iron lower in cost than a bronze material such as phosphor bronze or aluminum bronze is employed for the material of a worm wheel, and grinding of a worm is not necessary.

According to one aspect of the present invention, there is provided a worm speed reducer consisting of a worm made of a relatively hard material such as cast iron or steel and a worm wheel also made of a relatively hard material such as cast iron; wherein a material strength is set so that an amount of wear of the worm becomes larger than that of the worm wheel; a tooth surface of the worm wheel is formed with a network irregularity extending in both a direction of a cutting scratch due to cutting and a direction intersecting the direction of the cutting scratch, and also formed with a chemical conversion coating having a thickness smaller than a height of the irregularity; and a tooth surface of the worm is also formed with a network irregularity extending in both a direction of a cutting scratch due to cutting (or a grinding scratch due to grinding) and a direction intersecting the direction of the cutting scratch (or the grinding scratch) of the worm, and is formed with a chemical conversion coating having a thickness smaller than a height of the irregularity of the worm.

According to another aspect of the present invention, there is provided a manufacturing method for a worm and a worm wheel, comprising the steps of cutting tooth surfaces of the worm and the worm wheel to form an irregularity extending in a tooth depth direction on the tooth surfaces, rounding a top of the irregularity extending in the tooth depth direction, forming an irregularity extending in a tooth trace direction on the tooth surfaces, and forming a chemical conversion coating on the tooth surfaces formed with the irregularities extending in both the tooth depth direction and the tooth trace direction, the chemical conversion coating having a thickness smaller than a height of the irregularities.

In general, as a conventional method of obtaining good fit between a worm and a worm wheel meshing each other, the worm wheel made of a soft material such as phosphor bronze or aluminum bronze, which is expensive, is intentionally worn by the worm made of a harder material.

In contrast, according to the present invention, the chemical conversion coating formed on the contact surface of the worm is first peeled off in both the tooth depth direction and the tooth trace direction, and wear of the contact surface of the tooth trace direction, and wear of the contact surface of the worm rapidly proceeds. On the other hand, the chemical conversion coating formed on the contact surface of the worm wheel is also peeled off, and the top of the crest portion formed on the contact surface of the worm wheel is rounded. In this way, the chemical conversion coating is left on the trough portion formed on the contact surface of the worm wheel in both the tooth depth direction and the tooth trace direction, and seizure resistance can be maintained by a lubricating oil retained in the chemical conversion coating. In the course of maintaining the seizure resistance, a roughness of the tooth surface of the worm can be eliminated. In this way, seizure of the contact surfaces of the worm and the worm wheel in the initial stage of operation can be prevented, and the seizure resistance can be maintained even after operating the worm speed reducer for a long period of time.

Thus, a transmitting torque can be increased without the need of grinding of the worm.

In summary, various researches and studies concerning materials, lubrication and machining methods, etc. have been made to develop a worm and a wheel which can generate a large transmitting torque, and which can be manufactured at low costs. As the result, seizure resistance can be improved even in case of employing low-cost cast iron for the material of the worm wheel, by considering a balance of hardness of materials of the worm and the worm wheel, an irregularity on contact surfaces of the worm and the worm wheel, and a direction of the irregularity, and in combination by utilizing a retention effect of a lubricating oil in a chemical conversion coating such as a phosphate coating.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 1 is a schematic view illustrating sectional shapes of contact surfaces of a worm and a worm wheel after a cutting work in the prior art;

FIG. 3 is a schematic view illustrating sectional shapes of the contact surfaces shown in FIG. 2 after operation of the worm and the worm wheel;

DETAILED DESCRIPTION OF THE PREFERRED EMBODIMENT

There will now be described a preferred embodiment of the present invention with reference to the drawings.

FIGS. 4(m) to 4(p) show sectional shapes of contact surfaces of a worm and a worm wheel according to the preferred embodiment of the present invention.

Figure 2:
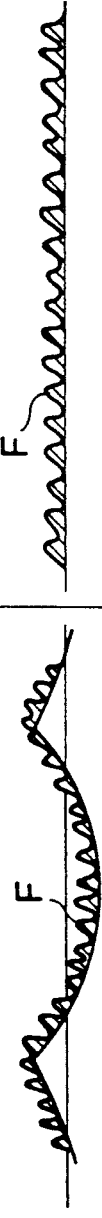
FIG. 2 is a schematic view illustrating sectional shapes of the contact surfaces treated with a chemical conversion coating after the cutting work.
Figure 4:
FIG. 4 is a schematic view illustrating sectional shapes of contact surfaces of a worm and a worm wheel according to the present invention.
Figure 8:
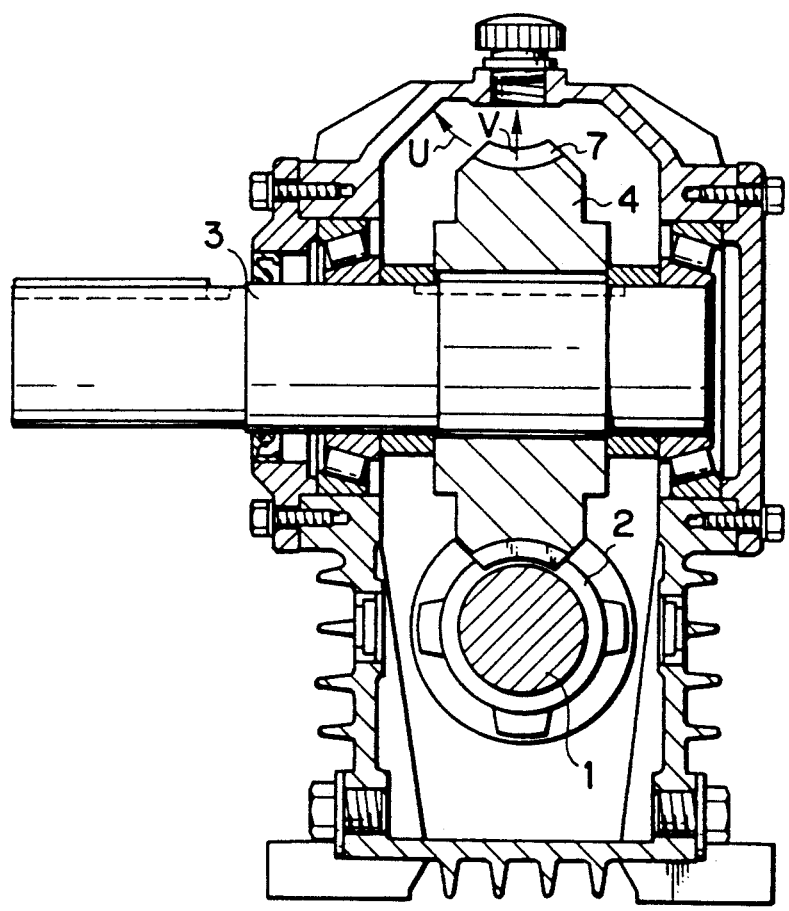
FIG. 8 is a cross section taken along the line 8—8 in FIG. 7.

The contact surface 7 of the worm wheel (see FIG. 8) is cut in the tooth trace direction U to form an irregularity consisting of a crest portion C and a trough portion D in the tooth depth direction V as shown in FIG. 4(o). Then, the top of the crest portion C of the contact surface 7 is rounded by shot peening or barrel finishing. Similarly, such a crest portion C and a trough portion D are also formed in the tooth trace direction U of the worm wheel as shown in FIG. 4(p). Then, a chemical conversion coating F is formed on the contact surface 7 as shown in FIGS. 4(o) and 4(p). A thickness of the chemical conversion coating F is set to be smaller than a height between the crest portion C and the trough portion D.

The height between the crest portion C and the trough portion D are set to preferably about 1–10μ, and the thickness of the chemical conversion coating F is set to preferably about 3–5μ smaller than the height between the crest portion C and the trough portion D.

On the other hand, the contact surface of the worm is similarly treated to form a surface condition as shown in FIGS. 4(m) and 4(n). The materials of the worm and the worm wheel are selected so that an amount of wear of the tooth surface of the worm during transmission of power becomes larger than that of the worm wheel.

In general, the number of times of contact of the worm is larger by several to tens of times than that of the worm wheel. Accordingly, the material of the worm is preferably the same as or slightly harder than that of the worm wheel to attain the amount of wear.

Figure 5:
FIG. 5 is a schematic view illustrating sectional shapes of the contact surfaces shown in FIG. 4 after operation of the worm and the worm wheel.
Figure 6:
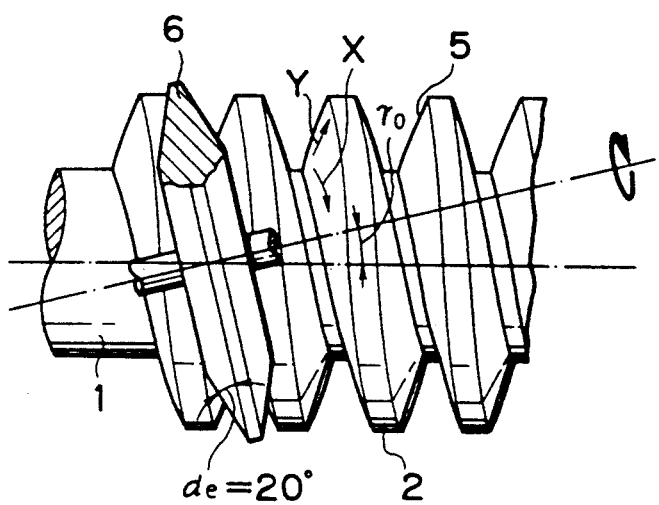
FIG. 6 is a side view of the worm.
Figure 7:
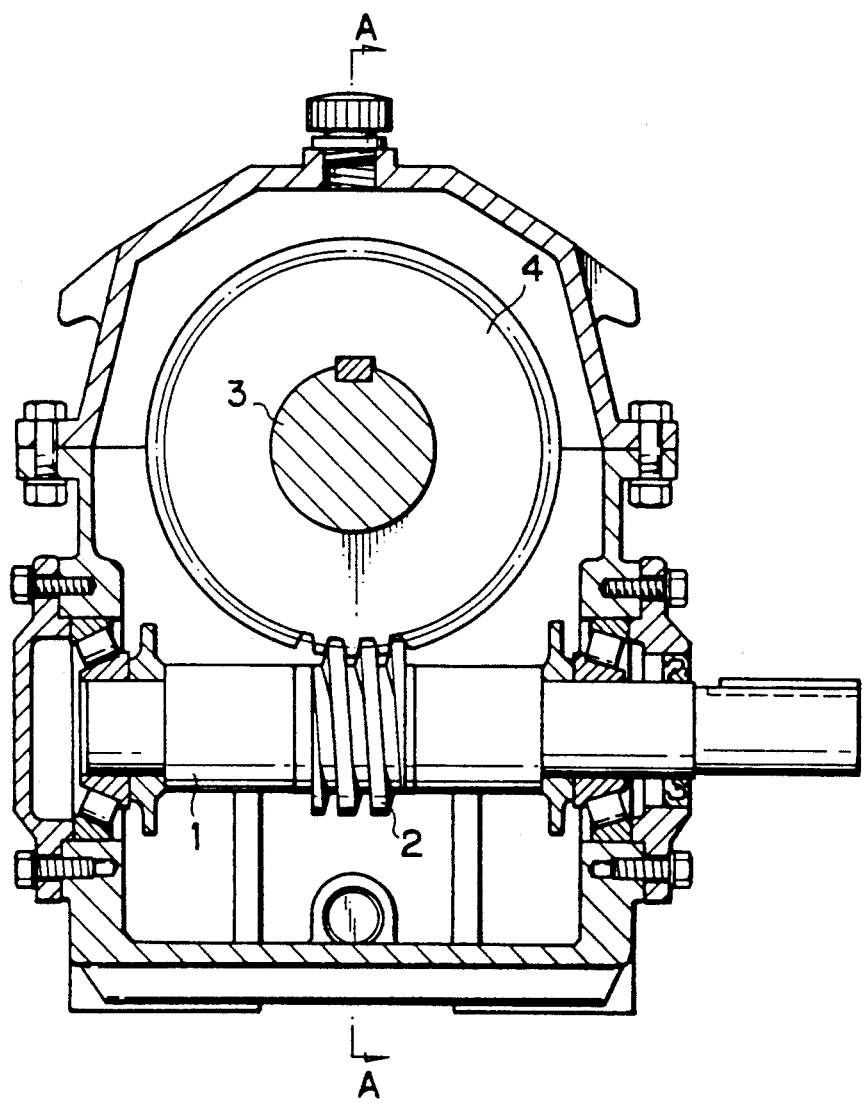
FIG. 7 is a sectional view of an example of a conventional worm speed reducer.

FIGS. 5(q) to 5(t) show sectional shapes of the contact surfaces of the worm and the worm wheel after operating the worm speed reducer for a long period of time. As shown in FIGS. 5(q) and 5(r), the chemical conversion coating F on the contact surface of the worm is peeled off in both the tooth depth direction and the tooth trace direction, and the wear of the contact surface proceeds.

On the other hand, as shown in FIGS. 5(s) and 5(t), the chemical conversion coating F on the crest portion C of the contact surface of the worm wheel is peeled off, and the tip of the crest portion C is rounded. A lubricating oil is retained by the chemical conversion coating F left on the network trough portion D extending in both the tooth depth direction and the tooth trace direction. As a result, seizure resistance can be maintained by the lubricating oil retained in the chemical conversion coating F. In the course of maintaining the seizure resistance, a roughness of the tooth surface of the worm can be eliminated. In this way, seizure of the contact surfaces of the worm and the worm wheel in the initial stage of operation can be prevented, and the seizure resistance can be maintained even after operating the worm speed reducer for a long period of time.

Since the lubricating oil is supplied by the chemical conversion coating F on the tooth surface, the oil film is hard to cut even in case of transmitting a large torque at low-speed rotation, which is disadvantageous for the formation of the oil film. Further, even when the oil film is finally cut by a very large load, seizure is hard to occur owing to the chemical conversion coating F.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A worm speed reducer, comprising:
a worm made from a relatively hard material having a material strength such that an amount of wear of said worm becomes larger than an amount of wear of a worm wheel, said worm having a tooth surface formed with a network irregularity extending in both a direction of a cutting scratch due to cutting and a direction intersecting the direction of the cutting scratch of the worm, said tooth surface also having a chemical conversion coating having a thickness which is smaller than a height of the network irregularity; said worm speed reducer further comprising
a worm wheel which engages said worm, said worm wheel being formed of a relatively hard material having a material strength which corresponds to the material strength of the worm such that an amount of wear of the worm is larger than that of the worm wheel, said worm wheel comprising a tooth surface formed with a network irregularity extending in both a direction of a cutting scratch due to cutting and a direction intersecting the direction of the cutting scratch, said tooth surface also having a chemical conversion coating having a thickness smaller than a height of said network irregularity of the tooth surface of the worm wheel.

2. The worm speed reduer as defined in claim 1, wherein said height of said network irregularity of each of said worm and said worm wheel is set to about 1–10 μ.

3. A worm speed reduer as defined in claim 1, wherein said thickness of said chemical conversion coating of each of said worm and said worm wheel is set to about 3–5 μ.

4. A worm speed reducer, comprising:
a worm made from a relatively hard material having a material strength such that an amount of wear of said worm becomes larger than an amount of wear of a worm wheel, said worm having a tooth surface formed with a network irregularity extending in both a direction of a cutting scratch due to cutting and a direction intersecting the direction of the cutting scratch of the worm, said tooth surface also having a chemical conversion coating having a thickness which is smaller than a height of the network irregularity; said worm speed reducer further comprising
a worm wheel which engages said worm, said worm wheel being formed of a relatively hard material having a material strength which corresponds to the material strength of the worm such that an amount of wear of the worm is larger than that of the worm wheel, said worm wheel comprising a tooth surface formed with a network irregularity extending in both a direction of a grinding scratch due to grinding and a direction intersecting the direction of the grinding scratch, said tooth surface also having a chemical conversion coating having a thickness smaller than a height of said network irregularity of the tooth surface of the worm wheel.

5. A manufacturing method for a worm and a worm wheel, comprising the steps of:

cutting tooth surfaces of said worm and said worm wheel to form an irregularity extending in a tooth depth direction on said tooth surfaces;

rounding a top of said irregularity extending in said tooth depth direction;

forming an irregularity extending in a tooth trace direction on said tooth surfaces; and forming a chemical conversion coating on said tooth surfaces formed with said irregularities extending in both said tooth depth direction and said tooth trace direction, said chemical conversion coating having a thickness smaller than a height of said irregularities.

* * * * *